(12) United States Patent
Ng et al.

(10) Patent No.: US 7,139,480 B2
(45) Date of Patent: Nov. 21, 2006

(54) SYSTEM AND METHOD FOR POWER MANAGEMENT IN AN OPTICAL NETWORK

(75) Inventors: Eddie Kai Ho Ng, Ottawa (CA); Derrick Remedios, Ottawa (CA); Colin Geoffrey Kelly, Ottawa (CA); Ping Wai Wan, Ottawa (CA); John Frederick Groves, Ottawa (CA)

(73) Assignee: Tropic Networks Inc., Kanata (CA)

( * ) Notice: Subject to any disclaimer, the term of this patent is extended or adjusted under 35 U.S.C. 154(b) by 661 days.

(21) Appl. No.: 10/673,790

(22) Filed: Sep. 30, 2003

(65) Prior Publication Data

US 2004/0264957 A1 Dec. 30, 2004

Related U.S. Application Data

(60) Provisional application No. 60/483,141, filed on Jun. 30, 2003.

(51) Int. Cl.
*H04B 10/08* (2006.01)

(52) U.S. Cl. .............................. 398/38; 398/25; 398/94; 398/177; 398/197; 398/181; 398/26; 398/27; 398/30; 398/33; 398/37; 398/10; 398/17; 359/341; 359/337; 359/333

(58) Field of Classification Search .................. 398/38, 398/25, 94, 197, 177, 181, 26, 27, 30, 33, 398/37, 10, 17; 359/333, 341, 337
See application file for complete search history.

(56) References Cited

U.S. PATENT DOCUMENTS

| 6,040,933 | A | 3/2000 | Khaleghi |
| 6,304,347 | B1 | 10/2001 | Beine et al. |
| 6,392,769 | B1* | 5/2002 | Ford et al. ............... 398/9 |
| 6,400,479 | B1 | 6/2002 | Zhou et al. |
| 6,701,087 | B1* | 3/2004 | Beine et al. ............ 398/38 |
| 2002/0101637 | A1 | 8/2002 | Khaleghi |
| 2003/0035170 | A1 | 2/2003 | DeGrange et al. |
| 2003/0053163 | A1 | 3/2003 | Li et al. |
| 2003/0133713 | A1 | 7/2003 | Ng et al. |

* cited by examiner

*Primary Examiner*—Hanh Phan
(74) *Attorney, Agent, or Firm*—Victoria Donnelly

(57) ABSTRACT

A method and system for multi-level power management in an optical network is provided. They include three levels of power management. The first level of power management dynamically changes equipment settings in each module of equipment so that required module setpoint values in each module are achieved. The second level of power management determines module setpoint values for each module of equipment within each node in the optical link so that required node setpoint values are achieved. The third level of power management determines node setpoint values at each node in the optical link so that the optical link meets predetermined power specifications. If any of the three levels cannot achieve the required setpoint values, an error signal is generated by that level of power management and sent to the level of power management above it, thus initiating a higher level of power management. As a result, a dynamic and automatic adjustment to changing operating conditions and configurations in the network is provided, which allows to maintain relatively stable network powers. Each level of power management is implemented such that sections of the network can operate independent of each other, thus increasing the survivability of the network.

22 Claims, 4 Drawing Sheets

SYSTEM AND METHOD FOR POWER MANAGEMENT IN AN OPTICAL NETWORK

RELATED APPLICATION

This application claims benefit of U.S. Provisional Patent Application Ser. No. 60/483,141 to Ng et al. entitled "System and Method for Power Management in an Optical Network", and filed on 30 Jun. 2003.

FIELD OF THE INVENTION

The present invention relates to optical networks, and in particular, to a method and system for multi-level power management in an optical network.

BACKGROUND OF THE INVENTION

Optical telecommunications networks are growing increasingly complex, developing beyond simple passive transport of signals to dynamic routing of the signals. A main objective of power management in these dynamic networks, for example metropolitan area networks (MANs), is the management of network power levels during adding and dropping of channels, network upgrades and reconfigurations. Several methods of such power monitoring and management in optical networks are currently available.

The U.S. Pat. No. 6,304,347 to Beine et al. issued Oct. 16, 2001 and entitled "Optical power management in an optical network", discloses a method of managing power levels in a network by providing the nodes of the network with configurable parameters at each node. The input powers to each node are maintained at a constant level by adjustment of the node configuration parameters. Thus, this patent provides management of network power by strictly maintaining constant power levels at specific points in the network, preventing the network from adapting to changing conditions such as component degradation.

The U.S. Published Patent Application No. 20030053163 to Li et al. dated Mar. 20, 2003 and entitled "Analogous channel method for performance monitoring and equalization in optical networks", discloses a method of monitoring and equalizing dense wavelength division multiplexing (DWDM) optical links by adjusting input power.

The U.S. Pat. No. 6,400,479 to Zhou et al. issued Jun. 4, 2002 and entitled "Optical Power Balancer for Optical Amplified WDM Networks", discloses a method of managing power levels in a network by adjusting transmitted signal powers to achieve a desired optical signal-to-noise ratio.

The U.S. Pat. No. 6,040,933 to Khaleghi et al. issued Mar. 21, 2000 and entitled "Method and apparatus for channel equalization in wavelength division multiplexed systems", discloses a method of equalizing channel powers by adjusting transmitted signal powers so that a first channel power is equal to a second channel power at a predetermined location in the optical network.

The U.S. Published Patent Application No. 20030035170 to DeGrange et al. dated Feb. 20, 2003 and entitled "Method and System for Coordinating and Utilizing Channel Power Information in an Optical Communications Network", discloses a method of coordinating channel powers information and determining weighting values for each channel in order to control channel launch powers, and a system for controlling channel launch powers based on these weighting values.

The U.S. Published Patent Application No. 20020101637 to Khaleghi et al. issued Aug. 1, 2002 and entitled "Method for Channel Balance", discloses a method of balancing channel powers by calculating the required transmitter power change to optimize such network parameters as Optical Signal To Noise Ratio (OSNR), Bit Error Rate (BER), channel power, and power spectral shape.

The last five patent documents provide power management only through control of transmitted or input power, limiting the degree to which the network can compensate for power level fluctuations.

The U.S. Published Patent Application No. 20030133713 to Ng et al. filed Jul. 17, 2003 and entitled "Method and System for Multi-Level Power Management in an Pptical Network", discloses a method and system of managing power levels in a network through equalization of channel powers at specific points in the network. This patent application restricts the operation of the network to the extent of maintaining equalized power between channels, between bands, and between fibers, leaving other global network operating parameters such as OSNR or BER outside of the scope of this application.

Therefore, there is a need in industry for the development of an improved method for comprehensive and dynamic power management in an optical network.

SUMMARY OF THE INVENTION

Therefore there is an object of the invention to provide a method and system for multi-level power management in an optical network that would avoid or minimize the above-mentioned drawbacks.

According to one aspect of the invention, there is provided a method for automatic multi-level power management in an optical network, comprising the steps of:

(a) determining node setpoint values for each node in the optical link so that the optical link meets predetermined power specifications;

(b) determining module setpoint values for each module of equipment within each node in the optical link so that the required node setpoint values of step (a) are achieved, otherwise generating a node level error signal; and (c) dynamically changing equipment settings in each said module of equipment so that the module setpoint values of step (b) are achieved, otherwise generating a module level error signal.

Beneficially, the step (a) of determining node setpoint values may comprise determining node setpoint values at the egress of each node in the optical link and the step (b) of determining module setpoint values comprises determining module setpoint values at the egress of each module.

Additionally, the steps (a) of determining node setpoint values and (b) of determining module setpoint values may comprise determining respectively node and module setpoint values continuously, periodically, or in response to a signal. The signal may be one of the node and module level error signals generated in the step (b) and (c) respectively, or it may be a signal manually generated by a user.

In a modification to the method of the embodiment of the invention, the step (a) of determining node setpoint values further comprises determining whether the optical link in the optical network meets predetermined link specifications, and if no, then generating a link level error signal.

As well, the predetermined link specifications may be defined as predetermined optical-signal-to-noise-ratio for the link.

According to another aspect of the invention, there is provided a system for automatic multi-level power management in an optical network, comprising:

(a) a network level power management sub-system for determining node setpoint values for each node in an optical link in the optical network in order meets predetermined power specifications for the optical link;

(b) a node level power management sub-system for determining module setpoint values for each module of equipment within each node in the optical link in order to achieve the required node setpoint values of sub-system (a), the node level power management sub-system comprising a node error means for generating a node level error signal; and (c) a module level power management sub-system for dynamically changing equipment settings in each said module of equipment in order to achieve the module setpoint values of sub-system (b), the module level power management sub-system comprising a module error means for generating a module level error signal.

Beneficially, the network level power management sub-system may determine node setpoint values at the egress of each node in the optical link and the node level power management sub-system may determine module setpoint values at the egress of each module.

Furthermore, the network and node level power management sub-systems may determine respectively node and module setpoint values continuously, periodically, or in response to a signal. The signal may be one of the node and module level error signals generated in the sub-systems (b) and (c) respectively, or they may be manually generated by a user.

The method and system for multi-level power management in an optical network of the embodiment of the invention provide the following advantages.

By distributing power management between three levels of control, the method and system for multi-level power management of the embodiments of the invention can both localize power management to a node or link, reducing the use of network resources, while performing power management on a network level to optimize such global parameters as optical signal to noise ratio (OSNR). Additionally, the layered structure of the power management in the network as described above allows for independent implementation of each layer of the power management, which provides survivability of the network in due to the independent operation of elements within each level of power management.

BRIEF DESCRIPTION OF THE DRAWINGS

Embodiments of the invention will now be described, by way of example, with reference to the accompanying drawings in which.

DESCRIPTION OF THE SPECIFIC EMBODIMENTS

Figure 1:
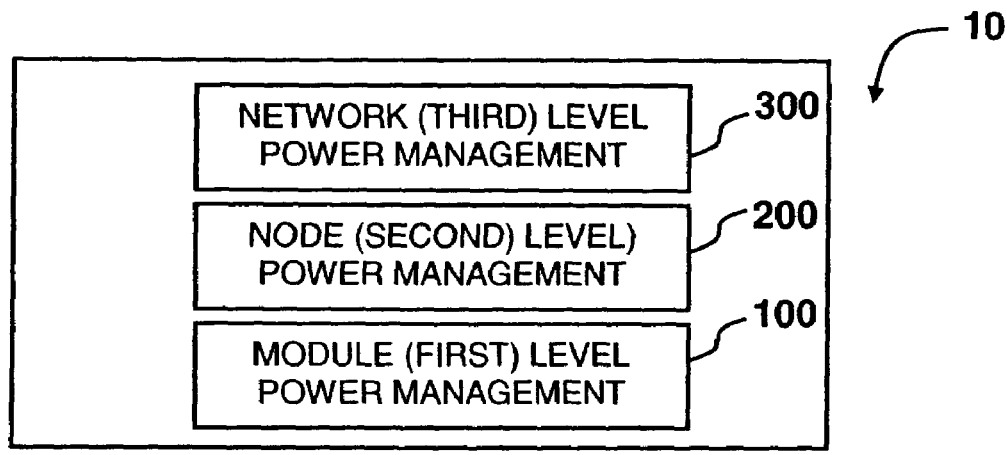
FIG. 1 is a diagram illustrating layers of multi-level power management in an optical network according to the embodiments of the invention.

A system 10 for multi-level power management in an optical network, according to the embodiment of the invention, is illustrated with the aid of FIGS. 1 to 4. The system 10 comprises three sub-systems: the sub-system 100 of the first level, the sub-system 200 of the second level, and the sub-system 300 of the third level, as shown in FIG. 1.

The sub-systems of the first, second, and third levels (100, 200, and 300 respectively) provide power management of functional units (modules) of equipment in the network, of equipment forming nodes in the network, and of connected nodes forming links in the network respectively. Thus, each sub-system performs a different aspect of power management in the network, the details of which will be described below.

Figure 2:
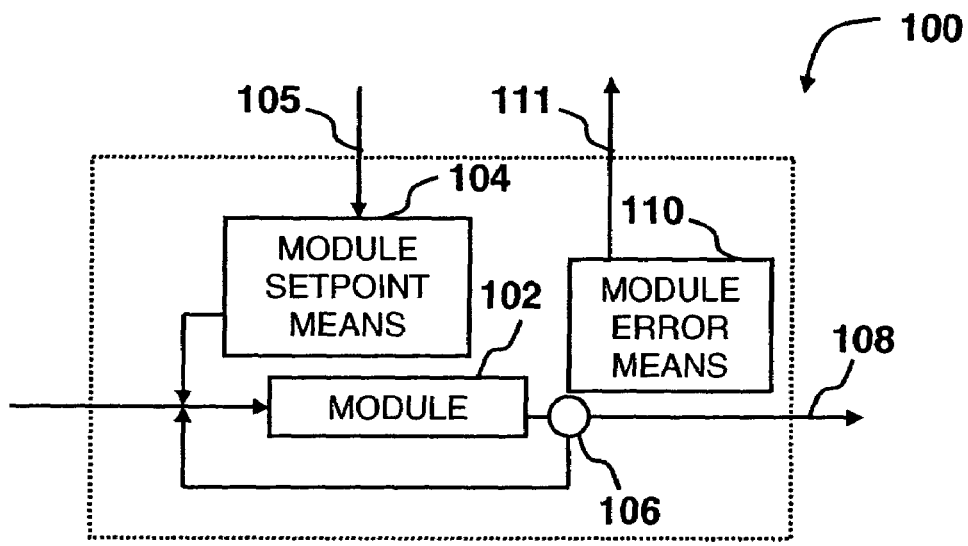
FIG. 2 shows an exemplary sub-system providing a first level power management illustrated in FIG. 1.

The first level 100 of power management provides dynamically changing settings of each functional unit or module of equipment in the network such that a certain module setpoint value is achieved, otherwise generating a module level error signal. FIG. 2 illustrates an exemplary sub-system 100 providing the first level power management in the optical network. It includes a module 102, a module setpoint means 104 for storing the module setpoint value 105, a power monitor 106, and a module error means 110 for generating a module level error signal 111. The module 102 may be, for example, an optical multiplexer, a dispersion compensating element, or an optical amplifier. The generated setpoint value 105 for the module may be, for example, a power setpoint value at the egress of the module.

The sub-system 100 providing the first level power management of the optical network operates as follows. The settings of the module 102 are adjusted so that the power level of the signal 108 at the egress of the module 102 is substantially equal to the module setpoint value 105 stored in the module setpoint means 104 after it is received from the sub-system 200 providing second level power management. This power level of the signal 108 at the egress is monitored by the power monitor 106 and used as feedback to adjust the settings of the module 102. If the module setpoint value 105 cannot be achieved by adjusting the settings of the module 102, then the module error means 110 for generating a module level error signal generates a module level error signal 111 and sends it up to the sub-system 200 providing the second level power management.

Figure 3:
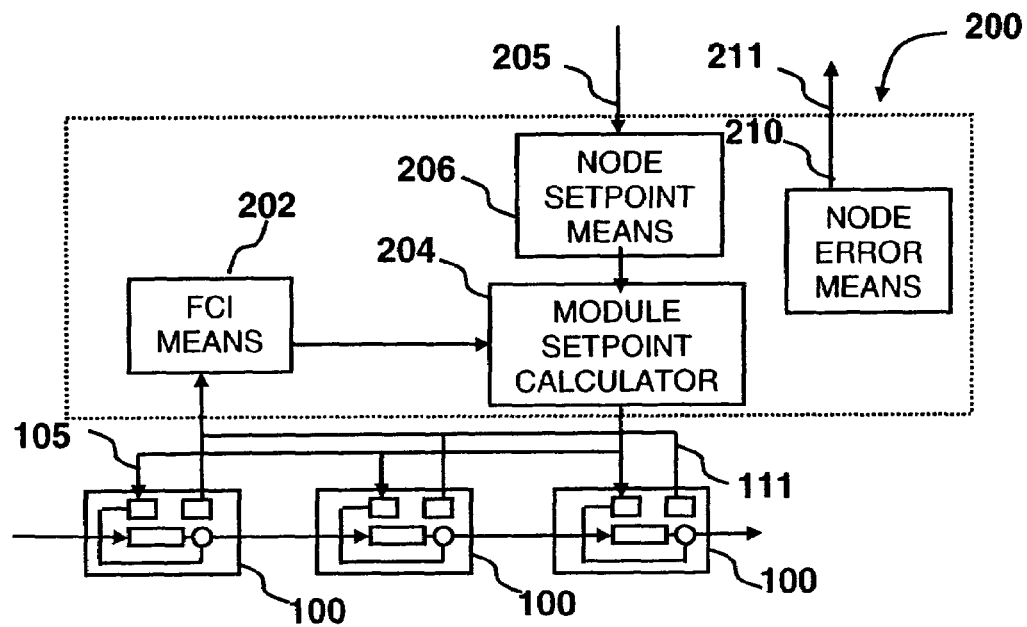
FIG. 3 shows an exemplary sub-system providing a second level power management illustrated in FIG. 1.

The second level of power management provides determining of required channel power levels at each module of equipment within each node in the network so that required channel power levels are achieved, otherwise generating a node level error signal. FIG. 3 illustrates an exemplary sub-system 200 providing the second level power management in the optical network. It includes a node setpoint means 206 for storing the node setpoint value 205, means 202 for determining which modules of equipment in the node require adjustment (fault correlation intelligence (FCI) means), a module setpoint calculator 204 for calculating setpoint values for those modules of equipment, and a node error means 210 for generating a node level error signal 211. The setpoint value 205 for the node may be, for example, a power setpoint value at the egress of the node.

The sub-system 200 providing the second level power management of the optical network operates as follows. The FCI 202 determines the necessary adjustments to the modules of equipment within the node in the network so that the node setpoint value 205 is satisfied. If the FCI means 202 determines that the node setpoint value 205 cannot be achieved by adjusting equipment settings within the node, then the node error means 210 generates a node level error signal 211 and sends it up to the sub-system 300 providing the third level power management. If the node setpoint value 205 can be achieved, then the required module setpoint values 105 are calculated by the module setpoint calculator 204 and sent to each of the sub-systems 100 providing first level power management.

Figure 4:
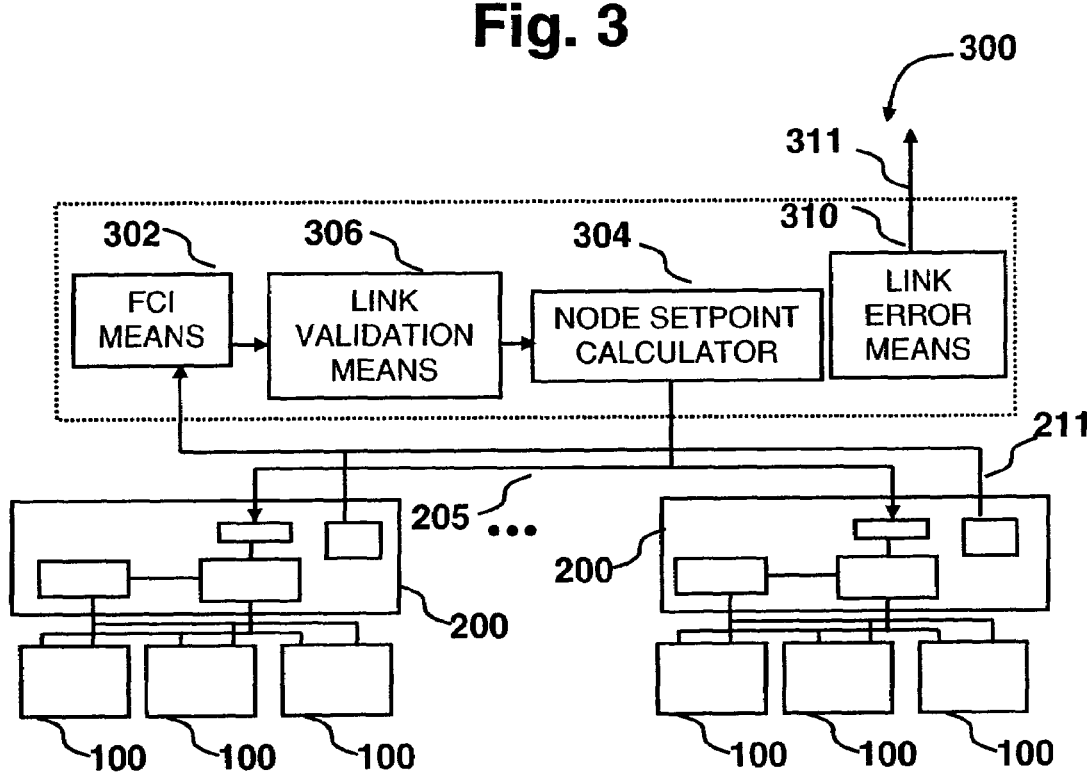
FIG. 4 shows an exemplary sub-system providing a third level power management illustrated in FIG. 1.

The third level of power management provides determining of required channel power levels at each node in the network so that the network meets predetermined power specifications. The predetermined power specifications may be formulated by, for example, a link planning tool. FIG. 4 illustrates an exemplary sub-system 300 providing the third level power management in the optical network. It includes means 302 for determining which nodes in the optical link require adjustment (fault correlation intelligence (FCI) means), a node setpoint calculator 304 for calculating setpoint values 205 for those nodes, and link validation means 306 for determining whether network operating conditions, such as optical signal to noise ratio, can be achieved. There may also be a link error means 310 for generating a link level error signal 311.

The sub-system 300 providing the third level power management of the optical network operates as follows. The FCI means 302 determines the necessary adjustments to the nodes within the optical link in the network so that required channel power levels are achieved. If the required channel power levels can be achieved then the required node setpoint values 205 are calculated by the node setpoint calculator 304 and sent to each of the sub-systems 200 providing second level power management. If the FCI means 302 determines that the required channel power levels cannot be achieved by adjusting node settings within the optical link, then the link error means 310 may generate a link level error signal 311 and send it up to a higher level of power management, such as to a user level interface.

Thus, a system for multi-level power management in an optical network is provided, including three subsystems 100, 200, and 300 for module, node, and optical link power management respectively in an optical network.

Figure 5:
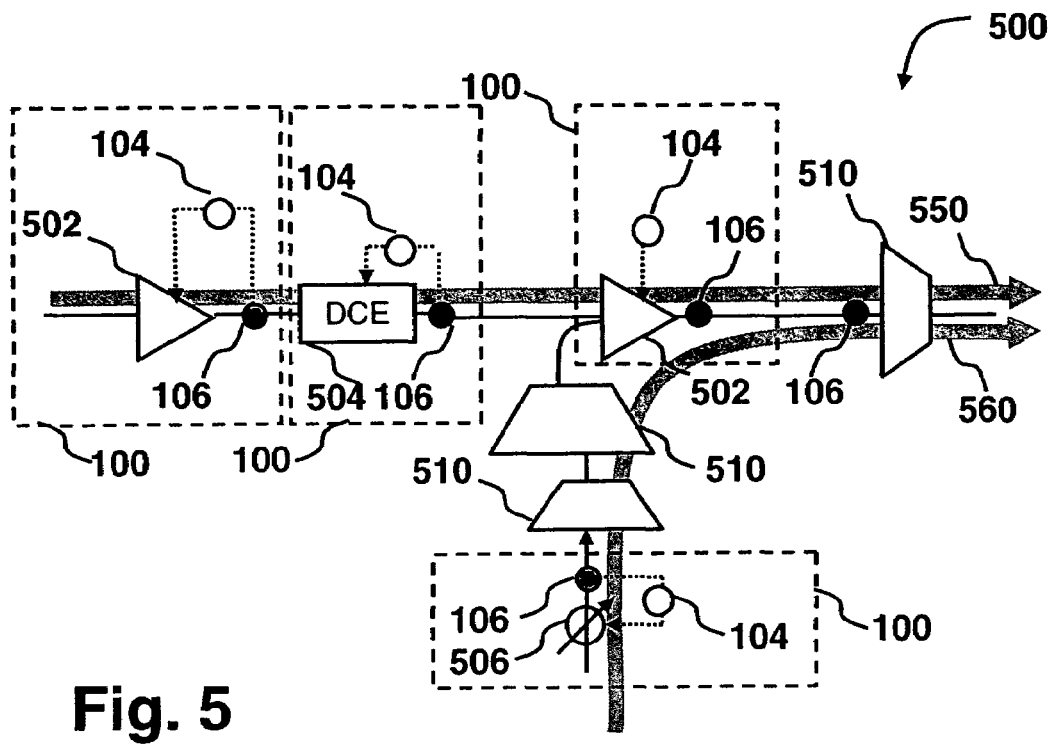
FIG. 5 shows one possible implementation of a number of subsystems of FIG. 1 residing in a node in the network.

FIG. 5 shows one possible implementation of a number of subsystems 100 of FIG. 1 residing in a node 500 in the network. The node 500 illustrated in FIG. 5 comprises a through path 550 including an amplifier 502a at the ingress, a dispersion compensating element (DCE) 504, and an amplifier 502b at the egress of the node inline with a multiplexer 510. The node also comprises an add path 560 including optical attenuators 506 and multiplexers 510. The modules of equipment under first level power management are the optical amplifiers 502a and 502b, the dispersion compensating element (DCE) 504, and the optical attenuator 506 and is denoted in the FIG. 5 by dashed boxes 100. The power level at the egress of each module is monitored by the power monitors 106 and used as feedback to adjust the settings of the modules so that the module setpoint values are satisfied.

Figure 6:
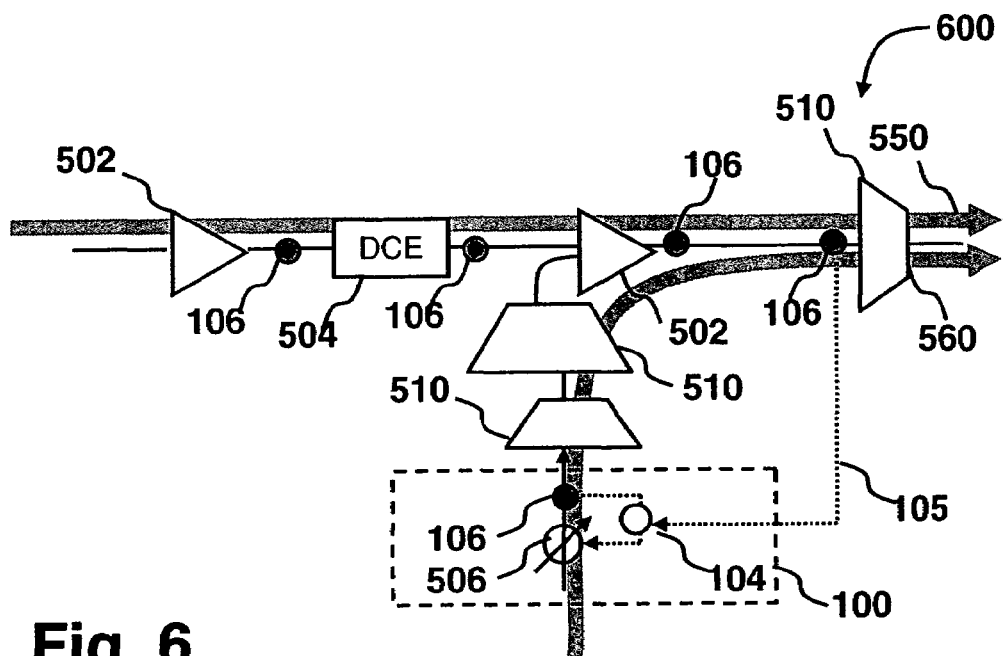
FIG. 6 shows an implementation of the sub-system of FIG. 2 providing second level power management of the node.

FIG. 6 shows an implementation of the sub-system 200 of FIG. 2 providing second level power management of the node 600. The node 600 illustrated in FIG. 6 is the same as that of FIG. 5, comprising the through path 550 and the add path 560. The node 600 adds a channel through the add path 560. The module setpoint value 105 is calculated by the module setpoint calculator in the sub-system 200 providing second level power management and provided to the subsystem 100 providing first level power management, the subsystem 100 including the optical attenuator 506.

Figure 7:
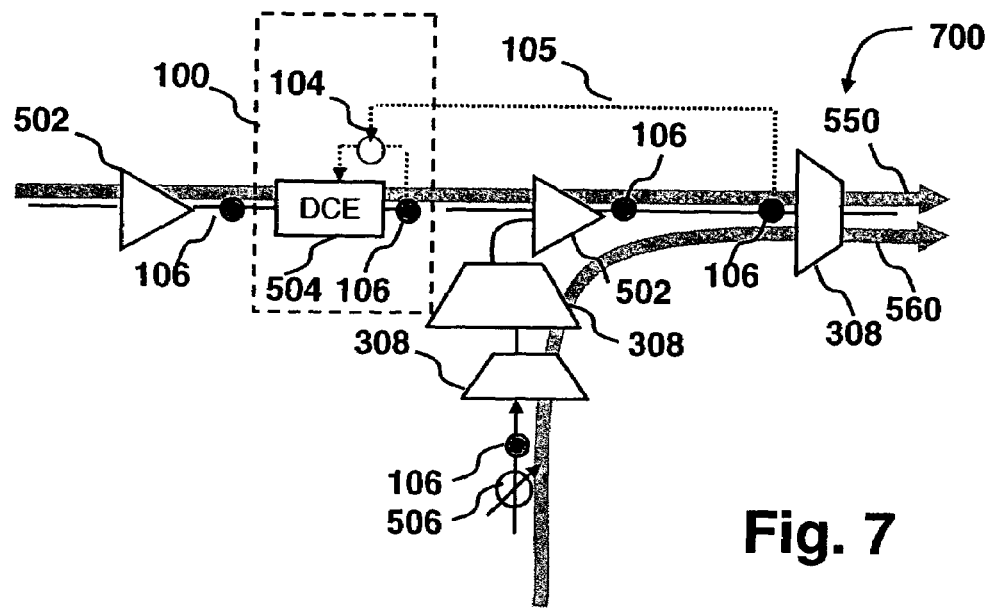
FIG. 7 shows yet another implementation of the sub-system of FIG. 2 providing second level power management of the node.

FIG. 7 shows yet another implementation of the subsystem 200 of FIG. 2 providing second level power management of the node 700. The node 700 illustrated in FIG. 7 is the same as that of FIG. 6, comprising the through path 550 and the add path 560. The node 700 does not add a channel through the add path 560 and so acts as a through node. The module setpoint value 105 is calculated by the module setpoint calculator in the sub-system 200 providing second level power management and provided to the subsystem 100 providing first level power management, the subsystem 100 including the dispersion compensating element 504.

Figure 8:
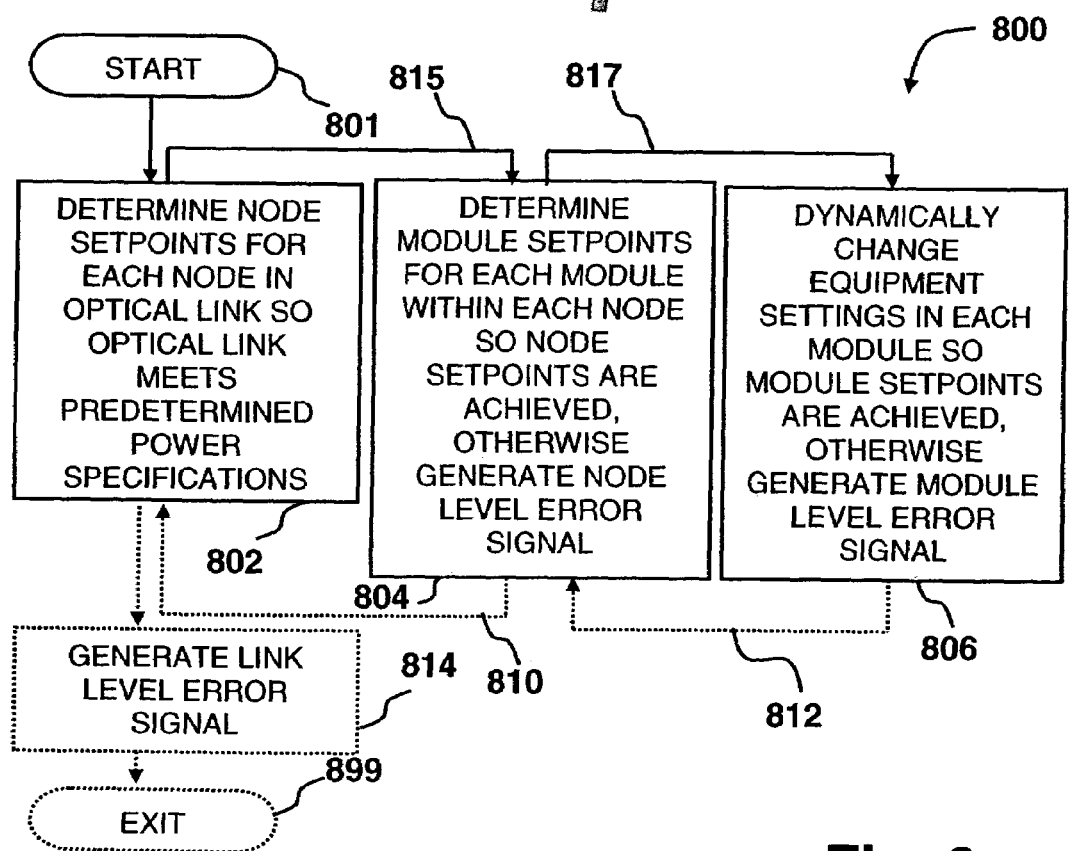
FIG. 8 is a diagram illustrating the steps of the method for multi-level power management in the optical network.

FIG. 8 is a diagram 800 illustrating the steps of the method for multi-level power management in the optical network performed in the system of FIG. 1. Upon start (step 801), the procedure 800 determines node setpoint values for each node in the optical link so that the optical link meets predetermined power specifications (step 802) and sends the results (815) to the next step.

The next step 804 determines module setpoint values for each module of equipment within each node in the optical link so that the required node setpoint values of step 802 are achieved and sends the results (817) to the next step 806. Otherwise, the step 804 generates a node level error signal and sends (810) the node level error signal to the previous step 802.

The step 806 dynamically changes equipment settings in each module of equipment so that the module setpoint values of step 804 are achieved, otherwise it generates a module level error signal and sends (812) the module level error signal to the previous step 804.

The procedure 800 cycles through these steps during operation of the network.

In one embodiment, one or more of the steps 802 and 804 of determining node and module setpoint values respectively comprises determining node and module setpoint values continuously. In a modification to the above embodiment, one or more of the steps 802 and 804 of determining node and module setpoint values may comprise determining node and module setpoint values periodically. In yet another modification to the above embodiment, one or more of the steps 802 and 804 of determining node and module setpoint values may comprise determining node and modules setpoint values only in response to a signal. The signal may be the error signals generated, for example, by the steps 804 and 806 respectively (routines 810 and 812) or they may be manually generated by a user.

In another modification to the method of FIG. 8, the step 802 may also generate a link level error signal (step 814) and then exit (step 899), the boxes 814 and 899 being shown in FIG. 8 in dashed lines as optional steps.

The described system and method for multi-level power management in an optical network have the following advantages.

By distributing power management between three levels of control, the method and system of the embodiment of the invention can both localize power management to a node or link, reducing the use of network resources, and also perform power management on a network level, for example to optimize such global parameters as OSNR. Additionally, the layered structure of the power management in the network as described above allows for independent implementation of each layer of the power management, which increases and survivability of the network in the form of independent operation of elements within each level of power management.

It is apparent to those skilled in the art that there are many variations of the present invention that retain the spirit of the invention. Thus it is intended that the present invention covers the modifications, variations, and adaptations of this invention provided they fall within the scope of the following claims.

What is claimed is:

1. A method for automatic multi-level power management in an optical network, comprising the following steps, which are performed for each optical link in the optical network:
    (a) determining node setpoint values for each node in the optical link so that the optical link meets predetermined power specifications;
    (b) determining module setpoint values for each module of equipment within each node in the optical link so that the required node setpoint values of step (a) are achieved, otherwise generating a node level error signal; and
    (c) dynamically changing equipment settings in each said module of equipment so that the module setpoint values of step (b) are achieved, otherwise generating a module level error signal.

2. A method as described in claim 1, wherein the step (a) of determining node setpoint values comprises determining node setpoint values at the egress of each node in the optical link.

3. A method as described in claim 1, wherein the step (b) of determining module setpoint values comprises determining module setpoint values at the egress of each module.

4. A method as described in claim 1, wherein the step (a) of determining node setpoint values comprises determining node setpoint values continuously.

5. A method as described in claim 1, wherein the step (b) of determining module setpoint values comprises determining module setpoint values continuously.

6. A method as described in claim 1, wherein the step (a) of determining node setpoint values comprises determining node setpoint values periodically.

7. A method as described in claim 1, wherein the step (b) of determining module setpoint values comprises determining module setpoint values periodically.

8. A method as described in claim 1, wherein the step (a) of determining node setpoint values comprises determining node setpoint values in response to a signal.

9. A method as described in claim 8, wherein the step (a) of determining node setpoint values comprises determining node setpoint values in response to the node level error signal generated in the step (b).

10. A method as described in claim 8, wherein the step (a) of determining node setpoint values comprises determining node setpoint values in response to a signal generated by a user.

11. A method as described in claim 1, wherein the step (b) of determining module setpoint values comprises determining module setpoint values in response to a signal.

12. A method as described in claim 11, wherein the step (b) of determining module setpoint values comprises determining module setpoint values in response to the module level error signal generated in the step (c).

13. A method as described in claim 11, wherein the step (b) of determining module setpoint values comprises determining module setpoint values in response to a signal generated by a user.

14. A method as described in claim 1, wherein the step (a) of determining node setpoint values further comprises determining whether the optical link in the optical network meets predetermined link specifications, and if no, then generating a link level error signal.

15. A method as described in claim 14, wherein the step of determining node setpoint values comprises defining the predetermined link specifications as predetermined optical-signal-to-noise-ratio for the link.

16. A system for automatic multi-level power management in an optical network, comprising:
    (a) a network level power management sub-system for determining node setpoint values for each node in an optical link in the optical network in order meets predetermined power specifications for the optical link;
    (b) a node level power management sub-system for determining module setpoint values for each module of equipment within each node in the optical link in order to achieve the required node setpoint values of sub-system (a), the node level power management sub-system comprising a node error means for generating a node level error signal; and
    (c) a module level power management sub-system for dynamically changing equipment settings in each said module of equipment in order to achieve the module setpoint values of sub-system (b), the module level power management sub-system comprising a module error means for generating a module level error signal.

17. A system as described in claim 16, wherein the network level power management sub-system comprises means for determining node setpoint values at the egress of each node in the optical link.

18. A system as described in claim 16, wherein the node level power management sub-system comprises means for determining module setpoint values at the egress of each module.

19. A system as described in claim 16, wherein the network level power management sub-system comprises means for determining node setpoint values in one of the following ways:
    continuously;
    periodically; and
    in response to a signal.

20. A system as described in claim 16, wherein the node level power management sub-system comprises means for determining module setpoint values in one of the following ways:
    continuously;
    periodically; and
    in response to a signal.

21. A system as described in claim 16, wherein the network level power management sub-system comprises means for determining node setpoint values in response to the node level error signal generated in the sub-system (b).

22. A system as described in claim 16, wherein the node level power management sub-system comprises means for determining module setpoint values in response to the module level error signal generated in the sub-system (c).

* * * * *